United States Patent [19]
MacDonald

[11] 3,766,474
[45] Oct. 16, 1973

[54] SIGNAL INDICATOR SYSTEMS

[75] Inventor: William MacDonald, Letchworth, England

[73] Assignee: Vernon Instruments Company Limited, Letchwork, Hertfordshire, England

[22] Filed: Sept. 28, 1972

[21] Appl. No.: 294,543

[52] U.S. Cl. .................. 324/99 D, 324/96, 324/122
[51] Int. Cl. ....................... G01r 17/06, G01r 13/02
[58] Field of Search .............. 324/99 R, 99 D, 100, 324/98, 122, 96

[56] References Cited
UNITED STATES PATENTS

| | | | |
|---|---|---|---|
| 2,775,754 | 12/1956 | Sink | 324/99 D |
| 2,940,071 | 6/1960 | Kindred | 324/99 D |
| 3,541,445 | 11/1970 | Taylor et al | 324/99 R |

*Primary Examiner*—Rudolph V. Rolinec
*Assistant Examiner*—Ernest F. Karlsen
*Attorney*—Joseph F. Brisebois et al.

[57] ABSTRACT

A signal magnitude indicator system includes polarity responsive means whereby a signal of other than predetermined polarity is inverted before being applied to a comparator in which it is compared with a temperature-compensated reference potential developed across a selected one of a plurality of resistors. Any error signal developed by the comparator controls a selector means to change the selection of resistor until the compared signals are alike. The selector means also controls the selection of one of a plurality of luminous electric indicators arranged in linear array to display the signal magnitude.

13 Claims, 6 Drawing Figures

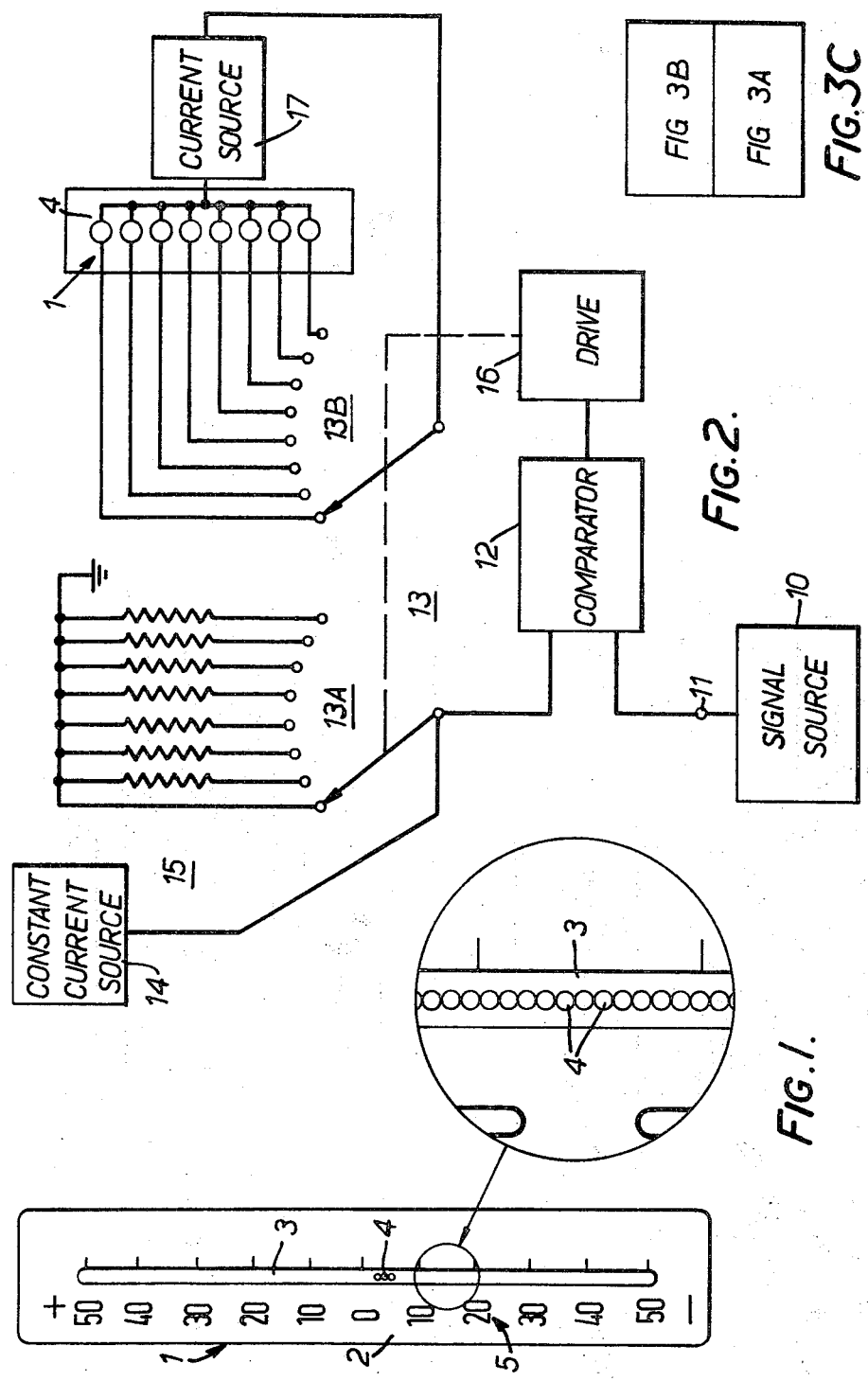

3,766,474

SIGNAL INDICATOR SYSTEMS

BACKGROUND OF THE INVENTION

This invention relates to improvements in signal magnitude indicator systems and is especially concerned with an indicator system for providing an indication of the output signal of a movement transducer.

SUMMARY OF THE INVENTION

A system in accordance with the invention for indicating the magnitude of an electric signal may comprise signal comparator means to one input of which the electric signal is applied, said comparator means being operable to compare the magnitudes of potentials applied to said two inputs and to yield an output signal representative of the difference between said signal magnitudes. The system also comprises a plurality of electric indicator means disposed in a linear array, each said indicator means being excitable by applied electric energy to provide a visible indication and a source of said electric energy. The system also comprises a like plurality of resistance means having mutually different resistance values and a source of constant current which may be passed selectively through one of said resistance means. The system further comprises selector means including first and second selector elements, said selector means being settable to a plurality of different conditions in each of which said first selector element selects a respective one of said resistance means to receive said constant current thereby to develop a respective potential thereacross and said second selector means connects a corresponding one of said electric indicator means to receive energy from said energy source. The system again comprises selector drive means operable by applied control signals to change progressively the setting of said selector means, first circuit means connecting said electric signal to one said input of said comparator means, second circuit means connecting the potential developed across said selected resistance means to the other input of said comparator means and third circuit means connecting said control signals from said comparator means to control said selector drive means to change the setting of said selector means until said potential has the same magnitude as said electric signal, whereby a selected one of said electric indicator means is excited thereby to denote the magnitude of said electric signal.

BRIEF DESCRIPTION OF THE DRAWINGS

Preferred features and advantages of the invention will become apparent from the following description of embodiments thereof, when taken in conjunction with the drawings, of which:

FIG. 1 represents a display device for an indicator system, with an enlarged portion thereof;

FIG. 2 is a schematic diagram used to describe the basic operation of an indicator system;

FIG. 3C is a diagram illustrating the relation of FIGS. 3A and 3B; and

DESCRIPTION OF THE PREFERRED EMBODIMENTS

Figure 3A:
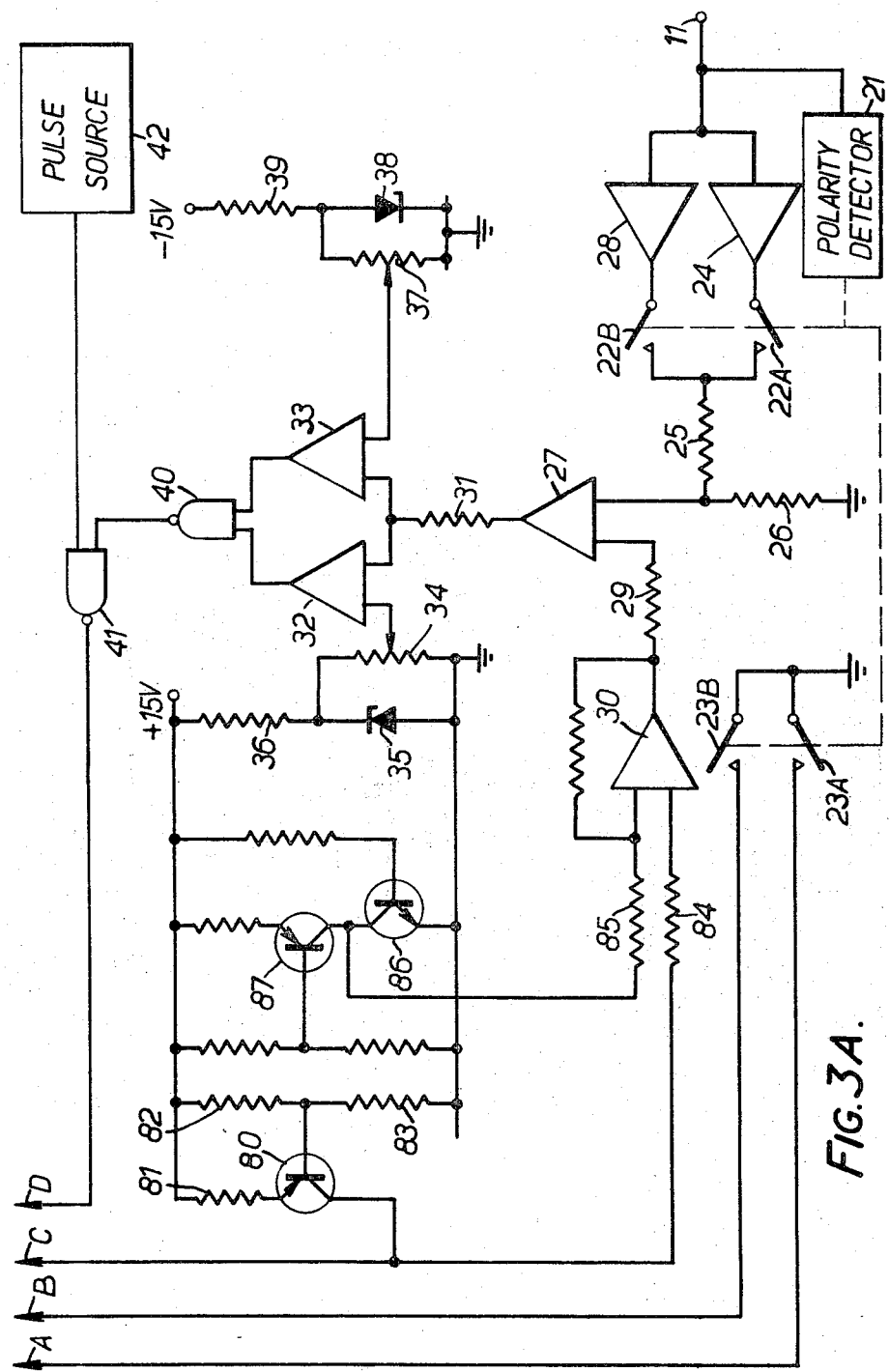
FIGS. 3A and 3B together constitute a partial circuit diagram of an indicator system, leads denoted by letter references leaving FIG. 3A are denoted by the same references on entering FIG. 3B.

The display device 1 illustrated in FIG. 1 comprises a panel 2 pierced by a slot 3 behind which are disposed in a linear and in the present embodiment a columnar array, a large plurality of juxtaposed luminous indicator devices 4. Devices 4 are conveniently gallium arsenide emitter diodes, but other forms of luminous indicator may be used if preferred. Device 1 is illustrated as being provided with a five-decade, centre-zero scale 5, but other forms of calibration may be employed to suit specific applications; the invention is equally applicable to many forms of calibration, as will presently appear.

FIG. 2 shows the basic system employed to operate the display; this diagram illustrates the provision of a few only of a much larger number of indications which are normally required in practice. The apparatus illustrated in FIG. 2 receives a direct voltage input signal from a signal source 10 at an input terminal 11, whence it is applied to one input terminal of a comparator circuit 12, the nature of which will become fully apparent from the later description with reference to FIGS. 3A and 3B. To the second input of comparator circuit 12 is applied a voltage selected by one bank 13A of a selector switch 13. The second input of comparator 12 is connected to a constant-current source 14 and to the wiper of switch bank 13A. Switch bank 13A connects the comparator input and the constant-current source 14 to earth by way of a selected one of a graded plurality of resistors 15. Thus the voltage at the amplifier input depends upon the value of the selected resistor. When the two input signals received by comparator circuit 12 are unequal, a switch drive device 16 is caused to step switch 13, thus changing the potential applied to the second input of comparator 12 until equality of input is attained, when the drive is stopped. Bank 13B of switch 13 then connects a selected one of the luminous indicator devices 4 of display device 1 to a current source 17, so that the indication provided by display device 1 corresponds to the value of the input signal voltage. Obviously, any desired resolution may be obtained in the measurement by increasing the number of steps provided by the selector swtich 13. For many reasons the use of a mechanical switch as the selector is inconvenient, and in practice it is preferred to employ solid-state switching arrangements such as those described below in relation to FIGS. 3A and 3B.

Figure 3B:
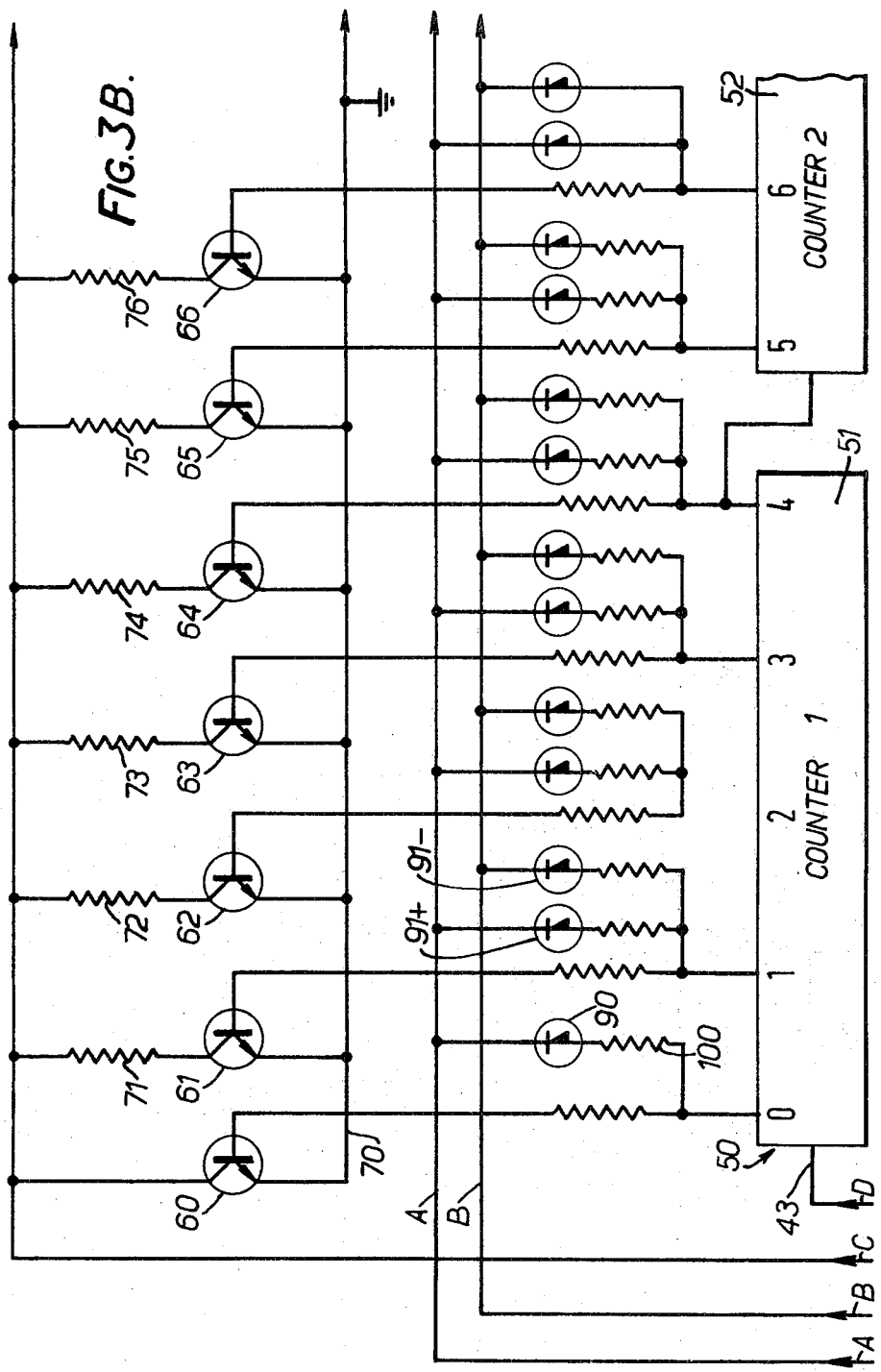

The arrangements illustrated in FIGS. 3A and 3B when related in the manner shown in FIG. 3C contain many refinements and additional features as compared with the relatively simple device described above in relation to FIG. 2. Direct-voltage signals received at input terminal 11 are applied to a known polarity detector arrangement 21 which responds to the actual polarity of the received input voltage by appropriate adjustment of two pairs of switch contacts 22A, 22B and 23A, 23B. When the input signal is of positive polarity, contacts 22A, 23A are closed; when the signal is of negative polarity, contacts 22B, 23B are closed. A positive signal is thus applied by way of an amplifier 24, which in the present embodiment has a gain of x5, to a potential divider formed by series-connected resistors 25 and 26, the junction of which is connected to one input of a difference amplifier 27. When the input signal is of negative polarity the input signal is applied to potential divider 25, 26 by way of an inverting amplifier 28 having in the present embodiment a gain of x5, equal to that of amplifier 24. In other embodiments, input amplification may be unnecessary. In such a case, amplifier 24 may be replaced by a direct connection or by a unity-gain buffer amplifier and amplifier 28 may be replaced by a unity-gain inverter. It is possible, should this be desirable in a particular application, for a negative signal to be treated differently as regards amplification from a positive signal.

The second input of difference amplifier 27 receives a reference input signal of which the value increases progressively during a cycle of operation. This signal is applied to the amplifier second input by way of a resistor 29 from the output of a further difference amplifier 30, of which the function is to compensate for thermal variations in the characteristics of the semi-conductor switching devices, as later described. For the moment, it suffices to understand that the signal received by amplifier 27 by way of resistor 29 increases progressively from zero towards the value of the signal applied to amplifier 27 by way of resistor 25. The output signal of amplifier 27 thus diminishes progressively. This signal is applied by way of a resistor 31 to one input of each of a pair of difference amplifiers 32, 33. To the second input of amplifier 32 is applied a positive reference voltage taken from a potentiometer 34, to which is applied the voltage developed across a Zener diode 35, of which the anode is earthed and the cathode is connected by way of a resistor 36 to a +15V supply. The second input terminal of amplifier 33 is also connected to a potentiometer 37. This potentiometer also receives the potential developed across a Zener diode 38, of which the cathode is earthed and the anode is connected by way of a resistor 39 to a −15V supply. The outputs of difference amplifiers 32, 33 are applied to an AND gate 40 which yields a logical I output signal whenever the value of the signal applied to amplifiers 32, 33 by way of resistor 31 is not within the positive and negative limits set by potentiometers 34 and 37. When the applied signal is between the two reference limits, the output of gate 40 becomes a logical 0. The output of gate 40 is applied to control a further AND gate 41. When the output of gate 40 is logical 0, gate 41 is closed; when gate 40 provides a I output gate 41 is opened to allow pulses from a pulse source 42 to pass by way of a lead D to FIG. 3B.

Referring now to FIG. 3B, pulses received from FIG. 3A by way of lead D are applied to the drive input of a multi-stage sequence counter. It is convenient to employ commercially available counter units each containing five counter stages and for this reason the counter, of which a small part only is shown for the sake of simplicity in explanation, is illustrated as comprising a sequence-connected chain of counter units such as 51, 52. In the quiescent condition of the system, the first stage of counter unit 51 sill be active and a positive output signal will appear on its 0 output. This signal is applied by way of a limiting resistor to the base of a "zero" switching transistor 60 which is thus turned on to permit current to flow by way of lead "C" from a constant-current source described below with reference to FIG. 3A to an earth line 70. As transistor 60 provides a substantially direct connection to earth from the constant-current source the potential appearing at the output of the source is approximately zero under these conditions. Means for avoiding difficulty due to the finite and thermally variable resistance of the switching transistors is described later.

The first drive pulse received by counter 50 will in turn advance the count by one stqge, so that a positive output will now appear at output 1 of counter unit 51. This will turn on transistor 61, thus earthing the output of the constant-current source by way of a resistor 71. As the count proceeds, switching transistors 62, 63 – 66 - will become conductive in turn, thus earthing the constant current source through resistors 72, 73 – 76 - of progressively increasing value and producing a corresponding increase in the potential appearing at the output terminal of the constant-current source.

A convenient embodiment of the constant-current source 14 will now be described with reference to FIG. 3A. A transistor 80 has its emitter connected to the +5V supply by way of a resistor 81 and its base held at an appropriate potential by connecting it to the tapping of a potential divider formed by resistors 82, 83, connected in series across the supply. The collector of transistor 80 now provides a constant current which is fed, by way of lead C to the switching transistors 60, 61 - of FIG. 3B. The collector of transistor 80, the potential of which varies progressively with the state of count of counter 50 as above described, is connected by way of a resistor 84 to one input of difference amplifier 30 already mentioned. The second input of amplifier 30 is fed by way of a resistor 85 with a stabilised voltage obtained by passing through a saturated transistor 86 a constant current obtained from a transistor 87 connected identically with transistor 80. Difference amplifier 30 thus provides an output of which the difference represents the potential appearing at the collector of constant-current transistor 80, compensated for thermal differences in the resistance of switching transistors 60, 61, -. As already described, this potential is compared with the amplified input signal and the result of this comparison controls the operation of counter 50, which will be stopped when the error voltage representing the difference between the input voltage and the voltage selected by the operation of the swiching transistors controlled by the counter is within the limits set by potentiometers 34 and 37.

When a positive signal appears at any output of a counter unit, this signal is applied to energize one of the indicator diodes which here provide the display. Counter output 0 has only a single indicator diode 90, which is connected to the 0 output of counter unit 51 by way of a limiting resistor 100, and is connected to the A lead from FIG. 3A. Counter unit output 1 is applied by way of like limiting resistors to two indicator diodes 91+ and 91−, which are respectively returned to the A lead and to the B lead. The remaining counter outputs are similarly provided with pairs of indicator diodes returned respectively to the A and B leads. As has already been noted, a positive input signal causes contacts 23A to close, thus connecting lead A to earth, while a negative input signal produces closure of contact 23B and thus earths lead B. Thus whatever the state of the counter, when "off-zero," a corresponding indicator diode appropriate to the polarity of the input signal will be energized. In the display of FIG. 1, the diodes returned to the A line will be disposed above the zero mark, while those connected to the B line will be below. Zero input signal causes polarity detector 21 to close contact 23A, so that the zero diode will be appropriately energized.

The above description does not consider the means required to produce repetitive cyclic operation of the apparatus. The necessary arrangements for returning the counter 50 to zero when a new measurement is to be effected will be readily apparent.

In a particular embodiment of the invention a total of eleven counter units is employed and the difference in reference potential obtained by advancing the counter by one count is made 100 millivolts, by appropriate selection of the value of the constant current and the values of the resistors 71, 72, -. The total range of input voltage at the comparison amplifier 27 is thus ±5.5V, corresponding to an input signal of ±1V at input terminal 11 when amplifiers 24 and 28 have gains of ×5 as described. The resolution of the system is then 20 millivolts. Other resolutions and ranges can be obtained by obvious modifications of the arrangements specifically described.

The system has particular application in displaying the output signal derived from a measuring transducer, but may equally well be applied to the display of signals from other devices.

Figure 4:
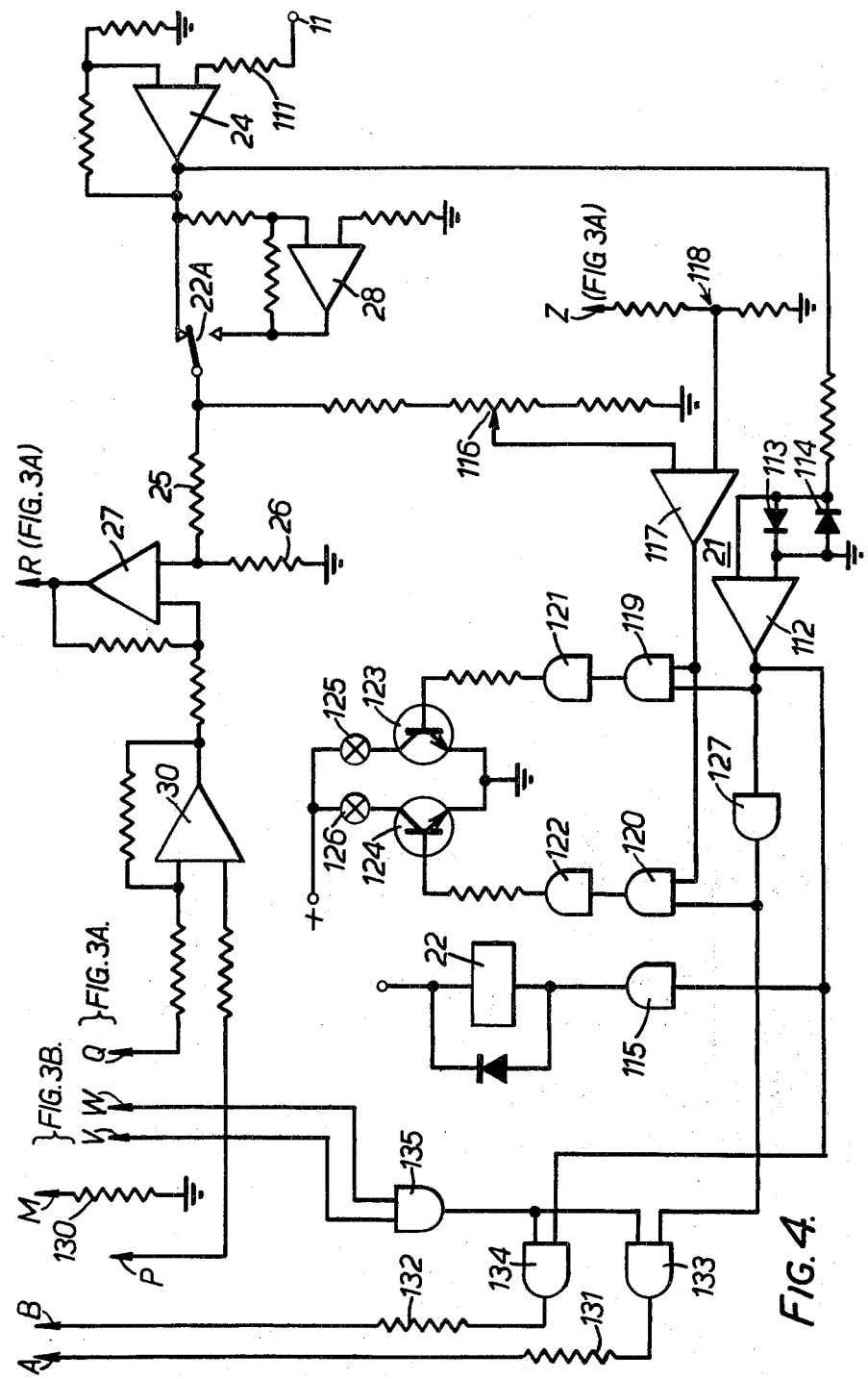
FIG. 4 is a partial circuit diagram illustrating modifications which may be made to the circuit FIGS. 3, 3A and 3B.

FIG. 4 is a partial circuit diagram illustrating modifications which may advantageously be made to the apparatus described above and which provides appropriate indications for both positive and negative out-of-range conditions, though either may be omitted if not useful.

In the arrangement shown in FIG. 4, signals received at input terminal 11 are applied by way of a resistor 111 to an amplifier 24, which as before may have a gain of ×5. The amplified signal is applied to a polarity detector 21 including a difference amplifier 112 to one input of which the amplified input signal output from amplifier 24 is applied. The other input of amplifier 112 is earthed and the two inputs are connected by a pair of diodes 113, 114 connected in inverse parallel. This arrangement will provide a signal output from amplifier 112 only for an input signal of negative polarity. If this output signal is present, it is fed through a driver inverter 115 to operate a relay 22. Contact 22A of relay 22 then changes over from the position shown in the drawing and instead of taking the amplified input signal directly from the output of amplifier 24 to resistor 25 takes instead the output of an inverting amplifier 28 which is fed with the output signal of amplifier 24. Inverting amplifier 28 is arranged to have unit gain by conventional means. The signal appearing at the junction of contact 22A with resistor 25 will thus always be of the same polarity, namely positive. This signal is applied by way of resistor 24 to the measuring circuit as already described and is also applied by way of an adjustable voltage divider 116 to an input of a difference amplifier 117, the other input of which is supplied with a reference potential derived by way of a voltage divider 118 from zener diode 35 (FIG. 3A).

Amplifier 117 will yield an output whenever the signal applied to it exceeds the reference potential and it is arranged by suitable adjustment of voltage divider 116 that this occurs whenever the input voltage exceeds the measuring range of the apparatus. The signal from difference amplifier 117 is applied alike to two and gates 119, 120. Gate 119 receives also the output signal from polarity detector 21, while gate 120 receives this signal after inversion by an inverter 127. Gate 119 will thus yield an output whenever a positive out-of-range signal is applied to input terminal 11, while gate 120 provides a signal if a negative out-of-range signal is received. Gates 119, 120 feed signals through respective inverters 121, 122 to control switching transistors 123, 124 which, when turned on, light the respective out-of-range indicator lamps 125, 126.

The arrowed leads P, Q and R are assumed to join the circuit arrangement of FIG. 3A at the correspondingly denoted points indicated by crosses on existing leads, the lower part of FIG. 3A corresponding with the new arrangement being then omitted. The direct and inverted outputs of polarity detector 21 are also advantageously taken by way of arrowed leads W and X to the further modification described below with reference to FIG. 5. are also advantageously applied to operate a blanking circuit which prevents the appearance of a complete group of flashing lights as the displayed indication changes, one diode only at a time being illuminated. The necessary circuit arrangement is also shown in FIG. 4 but it will be understood that this is an optional modification of the original circuit described in relation to FIGS. 3A and 3B.

The blanking circuit is connected in the leads A and B from FIG. 3B, in place of relay contacts 23A and 23B of FIG. 3A. When this arrangement is used, all the resistors connected in series with the light-emissive diodes such as 90, 91+ and 91− of FIG. 3B are omitted and replaced by direct connections. Additionally, the zero diode 90 is isolated from lead A and is provided with an individual lead M shown in broken line in FIG. 3B. This individual lead is taken to earth by way of a resistor 130, while the A and B leads respectively common to the positive and to the negative indicating diodes are fed through individual resistors 131 and 132 with the outputs of respective and gates 133 and 134. Gate 133 receives the inverted output signal of polarity detector 21 from inverter 127, while gate 134 receives the direct output of polarity detector 21. Both of gates 133 and 134 also received the output signal from a gate 135 which is fed with the outputs of amplifiers 32 and 33 via leads V and W (FIG. 3A). Gate 133 or 134, as may be, will be opened to sink the current from an indicator diode only when the measuring circuit is in balanced condition, and not otherwise. Thus one diode only is lit at any one time.

What is claimed is:

1. A system for indicating the magnitude of an electric signal, comprising:
    a source of said electric signal;
    signal comparator means having two inputs; said comparator means being operable to compare the magnitudes of potentials applied to said two inputs and to yield an output signal representative of the difference between said signal magnitudes;
    a plurality of electric indicator means disposed in a linear array, each said indicator means being excitable by applied electric energy to provide a visible indication;
    a source of said electric energy;
    a like plurality of resistance measn having mutually different resistance values;
    a source of a constant direct current;
    selector means including first and second selector elements, said selector means being settable to a plurality of different conditions in each of which said first selector element selects a respective one of said resistance means to receive and constant current thereby to develop a respective potential thereacross and said second selector means connects a corresponding one of said electric indicator means to said source of electric energy;

selector drive means operable by applied control signals to change progressively the setting of said selector means;

first circuit means connecting said electric signal to one said input of said comparator means;

second circuit means connecting the potential developed across said selected resistance means to the other input of said comparator means; and third circuit means connecting said control signals from said comparator means to control said selector drive means to change the setting of said selector means until said potential has the same magnitude as said electric signal, whereby a selected one of said electric indicator means is excited thereby to denote the magnitude of said electric signal.

2. The system claimed in claim 1 wherein said electric indicator means comprise light-emissive semiconductor diodes and said source of electric energy is a source of electric current.

3. The system claimed in claim 1 wherein said selector means includes electirc counter means operable by said comparator output signal to assume successively a plurality of conditions in each of which an output potential appears at a predetermined one of a said plurality of counter outputs and said first selector means includes a said plurality of semiconductor switching devices individually controlled by the potential appearing at a respective said counter output, each said switching device being connected to control the passage of said constant current from said source to a respective one of a plurality of resistors.

4. The system claimed in claim 1 and including also signal inverter means fed with said electric signal and developing an inverted electric signal, first switching means operable to connect said electric signal to said comparator means, second switching means operable to connect said inverted electric signal to said comparator means and polarity detector means responsive to an input signal of one polarity to operate said first switching means and responsive to an electric signal of the polarity opposite to said one polarity to operate said second switching means, whereby said comparator means receives always an electric signal of the same polarity.

5. The system claimed in claim 4 wherein a first series of said electric indicator means denotes electric signals of said one polarity and a second series of said electric indicator means denotes electric signals of said opposite polarity and said polarity detector means operates also to connect said energy source to said first or said second series of said electric indicator means in accordance with the detected polarity of said electric signal.

6. The system claimed in claim 1 wherein said second circuit means includes a difference amplifier, having two inputs, one input of said amplifier being connected to receive current from said constant-current source by way of a resistor and the other input of said difference amplifier being connected to receive the potential appearing across the collector/emitter path of a saturated transistor connected to pass current developed by a further constant-current source identical with the first said constant current source, the output signal of said difference amplifier being applied to said comparator means.

7. The system claimed in claim 3 wherein said selector drive means includes a source of pulse signals and pulse signal control means responsive to any excursion of said comparator output signal beyond predetermined lower and upper limiting voltages to permit said pulse signals to pass to said counter means.

8. The system claimed in claim 7 wherein said pulse signal control means includes first and second difference amplifiers each having a respective input connected by way of a common resistor to the output of said comparator, said first difference amplifiers having the other input thereof connected to a source of predetermined positive reference voltage and said second difference amplifier having the other input thereof connected to a source of predetermined negative reference voltage, and a two-input logical AND gate fed on its two inputs with the respective output signals of said first and second difference amplifiers, whereby said AND gate yields a logical 0 output signal when and only when the common signal applied to said second and third difference amplifiers has a value intermediate between those of said predetermined positive and negative reference voltages and a logical I signal at all other times.

9. The system claimed in claim 7 wherein said selector control means includes a further AND gate receiving said logical signals from said comparator means, a source of pulse signals and circuit means including said AND gate connecting signals from said source to said counter means.

10. The system claimed in claim 1 and including means whereby said energy source is connected to a said series of electric indicator means only when said compared potentials are of the same magnitude.

11. The system claimed in claim 1 and comprising means for comparing a voltage proportional to said electric signal with a reference potential and to respond to an excess of said voltage over said reference potential by providing an out-of-range indicating signal.

12. The system claimed in claim 11 and including logic means responsive to said out-of-range indicating signal and to a signal denotive of the polarity of an applied electric signal to yield respective signals denotive of said applied signal exceeding the measuring range in one or in the other polarity, and respective indicator means actuated by said respective signals.

13. The system claimed in claim 1 wherein said plurality of electric indicator devices are dispossed in a vertical rectilinear array.

* * * * *